March 4, 1930.  A. M. O'HAGEN ET AL  1,749,154
SHUTTER FOR MOTION PICTURE PROJECTORS AND CAMERAS
Filed Dec. 21, 1927
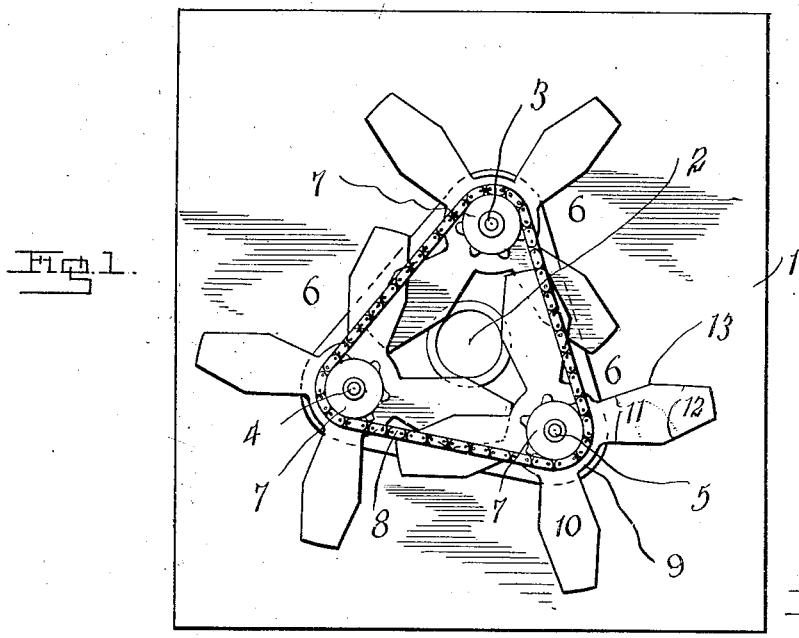
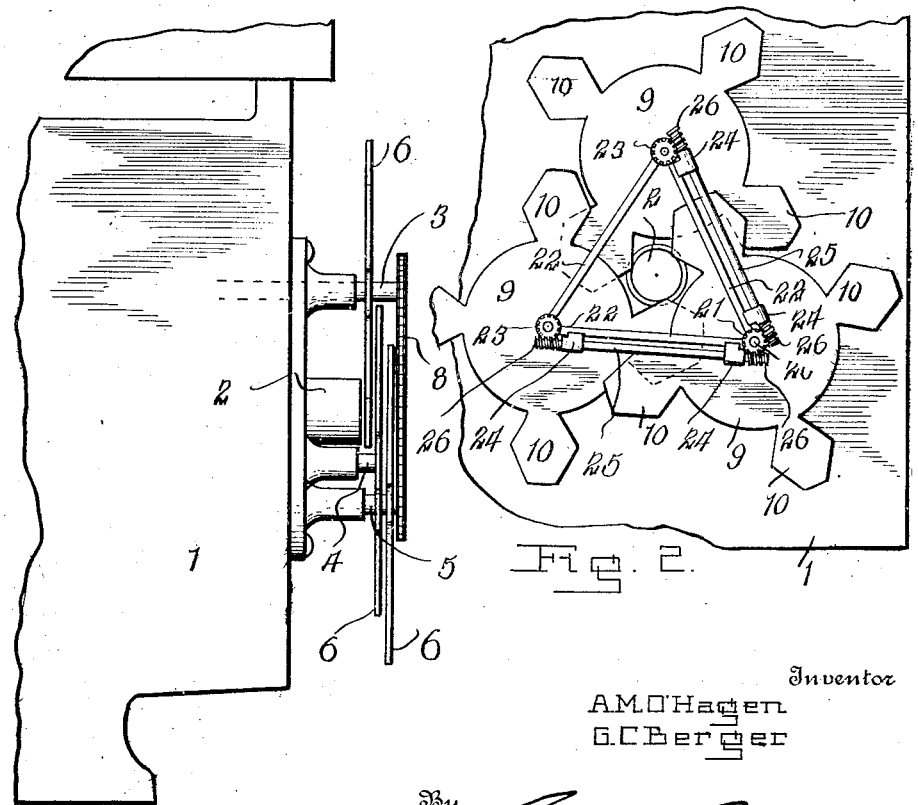
Inventor
A. M. O'Hagen
G. C. Berger
By
Lacey & Lacey, Attorneys Patented Mar. 4, 1930

1,749,154

UNITED STATES PATENT OFFICE

ARCHIBALD M. O'HAGEN AND GEORGE C. BERGER, OF FOSSTON, MINNESOTA

SHUTTER FOR MOTION-PICTURE PROJECTORS AND CAMERAS

Application filed December 21, 1927. Serial No. 241,617.

This invention relates to motion picture apparatus and has special reference to the shutters of motion picture projecting machines and cameras. Heretofore, motion picture projecting machines have been equipped with a single shutter having a plurality of blades which are rapidly moved past the lens so as to alternately cut off the light from the screen and permit the light to pass to the screen but such shutters have been objectionable for the reason that they permit flicker upon the screen which is trying upon the eyes of spectators and also detracts from the smooth effect of the pictures. It is the object of the present invention to provide a shutter mechanism by the use of which the light will be cut off and admitted to the screen at shorter intervals than heretofore and will be shut off or admitted in such a manner that the flicker will be eliminated. The invention is illustrated in the accompanying drawing and will be hereinafter described, the novel features being particularly pointed out in the appended claims.

In the drawing:

Figure 1 is a front elevation of our improved shutter;

Fig. 2 is an edge elevation of the same, a portion of the projecting machine being indicated in a conventional manner, and Fig. 3 is a view similar to Fig. 1 but showing a different form of gearing.

In the drawing, the reference numeral 1 indicates a portion of a motion picture projecting machine and 2 designates the projecting lens which may be of any approved form. Disposed concentrically about the lens and spaced at equal distances apart are a series of three shutter shafts 3, 4 and 5 upon each of which is secured a shutter 6, it being noted that the shutters are so disposed that they will overlap and are, therefore, arranged at different distances from the projecting machine in order that they may easily clear each other when in operation. At the same time, however, the shutters are arranged close enough together to avoid blurring by reason of the passage of light around the edges of the shutters. At the outer extremity of each shutter shaft, there is secured a sprocket pinion 7 and a sprocket chain 8 is trained around the several pinions so that the shutters will be rotated in the same direction and at equal speeds, the uppermost shutter shaft 3 being driven from the operating mechanism of the projecting apparatus in the usual manner. Each shutter consists of a hub member 9 and blades 10 radiating from the hub member, four blades being shown in the drawing and being usually employed as giving the most satisfactory results. Each blade has its side edges diverging outwardly from the hub, as shown at 11, to a point about midway the length of the blade and then converging outwardly, as shown at 12, toward the outer end of the blade and the length of the blade is such that it may extend entirely across the lens and the point 13 where the diverging and converging edges meet will pass across the lens at the axis thereof.

In Fig. 1, the shutters are shown in the position assumed when the blades are entering the field of the lens, and it will be noted that three blades will simultaneously pass across the lens and the angle 13 of each blade will follow an arc passing through the axial center of the lens. The blades pass across the lens in converging paths beginning at points spaced equi-distantly about the periphery of the lens and the result is that the light is cut off from the lens from its periphery inwardly in a plurality of directions, the relatively inclined edges of the several blades causing the light to be cut off in a gradual but rapid manner instead of abruptly on lines radial to the lens or parallel with a radius of the lens. As the blades leave the lens, the light will be gradually although rapidly admitted to the lens on paths which spread radially from the center of the lens instead of being admitted through one side portion of the edge and then gradually spreading over the lens to the opposite side thereof. As a result of this operation, the light is cut off from the screen and admitted thereto at shorter intervals than heretofore and also in a more even manner than heretofore so that the objectionable flicker is minimized, if not entirely eliminated, and a more pleasing effect is obtained in the production. The device is exceedingly simple and inexpensive and may be readily applied to existing machines as well as to machines hereinafter manufactured.

While we have shown sprocket gearing in Figs. 1 and 2 for rotating the shutters, other forms of gearing may be employed, and spiral gearing is illustrated in Fig. 3. In Fig. 3, the driving shaft 20 is equipped with a spiral pinion 21 and frame rods 22 extend between and provide outer bearings for all the shutter shafts, spiral pinions 23 being provided on the driven shutter shafts. The frame rods 22 which diverge from the driving shaft carry bearings 24 in which are journaled transmission shafts 25 each equipped at its ends with pinions 26 meshing with the respectively adjacent pinions 21, 23.

Having thus described the invention, we claim:

1. A shutter mechanism for motion picture apparatus comprising three shutters arranged concentrically about the lens of the apparatus and spaced equal distances apart and each consisting of a hub member, and four blades radiating therefrom, the blades having their side edges diverging outwardly from the hub and then converging outwardly to the end of the blade.

2. A shutter mechanism for motion picture apparatus comprising three shutters arranged equi-distantly and concentrically about the lens of the apparatus, a shaft for each shutter, one shaft being a driving shaft, frame bars disposed in triangular relation and connecting the driving shaft with both driven shafts and the driven shafts with each other, diverging transmission shafts mounted on the frame bars extending from the driving shaft, and gearing at the ends of the transmission shafts connecting them with the respective shutter shafts whereby to rotate the shafts synchronously.

3. A shutter mechanism for motion picture apparatus comprising three shutters each having a blade arranged concentrically and symmetrically about the lens of the motion picture apparatus, the blade of each shutter having its side edges diverging outwardly to a point which travels across the center of the lens and then converging outwardly to the end of the blade, forming an obtuse angle.

4. A shutter mechanism for motion picture apparatus comprising three shutters each having a plurality of blades arranged concentrically and symmetrically about the lens of the motion picture apparatus, the blades of each shutter having their side edges diverging outwardly to a point which travels across the center of the lens and then converging outwardly to the end of the blade, forming an obtuse angle, the length of the blades being such that each blade in its travel passes entirely across the lens.

In testimony whereof we have affixed our signatures.

ARCHIBALD M. O'HAGEN. [L. S.]
GEORGE C. BERGER. [L. S.]